United States Patent Office

3,496,234
Patented Feb. 17, 1970

3,496,234
METHOD OF PREPARING QUATERNARY PHOSPHONIUM COMPOUNDS
Pieter Henri van Leeuwen, Van Houtemlaan, Netherlands, assignor, by mesne assignments, to U.S. Philips Corporation, New York, N.Y., a corporation of Delaware
No Drawing. Filed May 23, 1967, Ser. No. 640,504
Claims priority, application Netherlands, May 19, 1966, 6606916
Int. Cl. C07f 105/02, 9/02
U.S. Cl. 260—606.5                              8 Claims

ABSTRACT OF THE DISCLOSURE

Quaternary phosphonium compounds are produced by reacting a reduction complex of an aluminum or boron hydride for example $LiAlH_4$ with an ester, aldehyde, ketone or acid with a mixture of a proton donor and a trialkyl phosphine or a triaryl phosphine.

---

The invention relates to a method of preparing quaternary phosphonium compounds.

It is known that quaternary trialkyl- and triaryl-phosphonium compounds may be used as reagents in so-called Wittig reactions in which compounds having a double carbon-carbon bond are created. In these reactions a phosphorane which is obtained from the corresponding quaternary phosphonium compounds by means of a base, usually in situ, is reacted with an oxo compound. Thus one can for example react an axeropthylidene triphenyl phosphonium salt with Vitamine-A-aldehyde to prepare β-carotene.

A few methods are already known of preparing quaternary phosphonium compounds. For example, in Dutch patent specification 101,856 it is described that these compounds may be obtained from alcohols by means of triarylphosphine hydrohalogenides.

According to Dutch patent application 6,405,660, quaternary phosphonium compounds may also be obtained from esterified alcohols with a hydro salt of a triarylphosphine.

Some alcohols and esterified alcohols are prepared via synthesis routes which are carried out through the corresponding aldehyde. For example, vitamin A alcohol can be prepared by reducing vitamin A aldehyde, which can be prepared by various routes, with a hydride, for example, $NaBH_4$. In such a reduction a complex compound is obtained which is converted into the alcohol by hydrolysis.

It is known that for economical reason it is of importance if for the preparation of a substance a method is available by which it is possible to skip a synthesis step or an isolation.

It has surprisingly been found that the complex compounds which are obtained in the reduction of aldehydes with dialkyl aluminium hydrides, for example, DIBAH (diisobutylaluminum hydride) and $LiAlH_4$, $NaBH_4$, $NaAl[CH_2CH(CH_3)_2]_2H_2$, $(C_2H_5O)_3AlHLi$, $Al(BH_4)_3$ and similar hydrides, can be converted directly into quaternary phosphonium compounds. The same was found of the complexes which are structurally closely related and which are formed in the reduction of ketones. It is to be noted that complexes identical to aldehyde reduction complexes are obtained in the reduction of carboxylic acids and esterified carboxylic acids.

In agreement herewith the invention relates to a method of preparing quaternary trialkyl- and triaryl phosphonium compounds, characterized in that the reduction complex obtained in reducing an aldehyde, ketone, carboxylic acid or carboxylic esters, with a hydride is reacted with a trialkyl- or triaryl phosphine and a proton donor.

The reaction may be carried out both with reduction complexes of aliphatic and aromatic acids, aldehydes, ketones and esters, such as for example acetic acid, cinnamic aldehyde, ethylbenzoate, acetone, propiophenone, acrolein, acrylic acid. A very important application, however, is that on conjugated unsaturated acids, aldehydes, ketones and esters. More especially those on similar compounds having the vitamin A-structure or a structure which is closely related thereto. For example, with the method according to the invention raw materials for preparing β-carotene, zeaxanthin, xanthophyl and canthazanthin can be obtained.

Both trialkyl- and triarylphosphines may be used, for example, trianisylphosphine, tritolylphosphine and trinaphthylphosphine, but triphenylphosphine is to be preferred.

Organic and inorganic acids, for example, hydrohalogenic acids, p-toluene sulphonic acids and sulphuric acid may be used as proton donors.

The reaction is preferably carried out in the presence of an inert polar solvent or diluent. As such are to be mentioned inter alia: nitrobenzene, benzonitrile, nitromethane, acetonitrile, methylethylketone and acetone.

The temperature of the reaction mixture may vary between rather wide limits. In general the temperature will be between −50° C. and +100° C., as a rule between 0° C. and 50° C. The reaction is preferably carried out in an inert gas atmosphere, for example, in nitrogen or argon. Since the reaction is carried out in a dry medium and no water is formed during the reaction either, the preparation according to the invention has the advantage over these starting from alcohols that the reaction product contains no water which may be disturbing in the subsequent coupling reaction with an oxo compound.

In order that the invention may readily be carried into effect, it will now be described in greater detail, with reference to the following specific examples.

EXAMPLE 1

7.1 gms. of vitamin A aldehyde dissolved in 50 mls. of absolute benzene were reduced at room temperature with 5 mls. of di-isobutylaluminiumhydride. A solution of 6.55 gms. of triphenylphosphine in 150 mls. of nitrobenzene were then added to the reaction mixture. The solution was stirred for a few minutes to obtain a homogeneous solution. 2.7 mls. of concentrated sulphuric acid were then added dropwise with vigorous stirring. The solution was strongly colored while the temperature of the mixture rose from 20° C. to 50° C. The solution was cooled to room temperature and stirred for another 90 minutes. The yield of axerophtylidene triphenyl phosphonium hydrosulphate was determined at 90% by means of the UV-spectrum.

The resulting quaternary phosphonium compound was coupled with vitamin A aldehyde as follows:

7.1 gms. of vitamin A aldehyde were added to the reaction mixture after which the mixture was stirred until a homogeneous solution was obtained. A solution of 10 gms. of KOH in 50 mls. of methanol was then added within 10 minutes while stirring. After stirring for another 5 minutes, the mixture was transferred to a separating funnel, washed twice with 250 mls. of 2 N sulphuric acids and three times with 250 mls. of water. The solution was filtered through a water-repellent filter after which the volume of the liquid was made up to 500 mls. in a measuring flask. The yield, calculated from the extraction at 448 nm., was 51%.

EXAMPLE 2

4.78 gms. of β-ionone (0.025 mol) were reduced with 5 ml. of DIBAH (0.025 mol) in 100 mls. of petroleum ether 40–60.

The petroleum ether was distilled off in vacuo (approximately 10 cm.) at maximally 25° C. while adding 250 mls. of nitroethane, after which 6.55 gms. (0.025 mol) of triphenyl phosphine were dissolved in the reaction mixture.

In approximately 2 minutes 2.70 mls. (=0.05 mol) of concentrated sulphuric acid were then added to the reaction mixture while stirring vigorously after which the mixture was stirred under nitrogen at 25° C. for 18 hours.

From the UV-measurements of the reaction mixture it was found that the phosphonium salt had formed ($\lambda_{max}$ 268 nm. in acid (0.01 $NH_2SO_4$) methanol).

EXAMPLE 3

6.46 gms. (0.025 mol) of $\beta_{18}$-ketone were dissolved in 50 mls. of petroleum ether 40–60 and reduced with 5 mls. (0.025 mol) of DIBAH.

The reduction complex was transferred to approximately 250 mls. of nitroethane while distilling off the petroleum ether at maximally 25° C. in vacuo (approximately 10 cm.).

6.55 gms. (0.025 mol) of triphenylphosphine were added followed by 2.70 mls. of concentrated sulphuric acid which were added in approximately 2 minutes while stirring vigorously.

A somewhat cloudy pale-yellowish brown colored solution was formed which was stirred under nitrogen at 25° C. for 30 hours.

From the UV-measurements of the reaction mixture it was found that the phosphonium salts had formed ($\lambda_{max}$ 310 nm. in acid (0.01 $NH_2SO_4$) methanol).

EXAMPLE 4

7.12 gms. (=0.025 mol) of crystalline all-trans $\beta_{20}$-aldehyde with 0.25 gm. of $LiAlH_4$ were stirred under nitrogen for one hour at 25° C. in 100 mls. of absolute ether.

100 mls. of nitroethane were added and the ether was distilled off in vacuo at maximally 25° C. while stirring vigorously, another 150 mls. of nitroethane being added to the reaction mixture. A suspension of the $\beta_{20}$-aldehyde reduction complex was formed since the reduction complex turned out to be poorly soluble in the nitroethane. 7.30 gms. (0.028 mol) of triphenylphosphine were added to this suspension and then 1.50 mls. (0.028 mol) of concentrated sulphuric acid were added in approximately 2 minutes while stirring vigorously.

The mixture was then stirred at 25° C. under nitrogen for two hours after which is was found from the UV-measurements of the reaction mixture that the $\beta_{20}$-aldehyde from which was started had been converted for 87% into the corresponding phosphonium salt.

EXAMPLE 5

7.12 gms. (=0.025 mol) of crystalline all-trans $\beta_{20}$-aldehyde were dissolved with 0.24 g. of $NaBH_4$ in 50 mls. of absolute ethanol. The solution was stirred under nitrogen at 25° for 1 hour after which 6.55 gms. of triphenylphosphine and 150 mls. of nitrobenzene were added.

The reaction mixture was stirred until homogeneous (5 minutes) after which 1.35 mls. (=1 mol eq.) of concentrated sulphuric acid were added while stirring thoroughly. Stirring was then continued at 25° under nitrogen for three hours.

It was found from the UV-measurements of the reaction mixture, that the $\beta_{20}$-aldehyde from which was started had been converted for 85% into the corresponding phosphonium salt.

EXAMPLE 6

7.12 gms. (=0.025 mol) of crystalline all-trans $\beta_{20}$-aldehyde were dissolved in 25 mls. of absolute toluene and reduced with 5 mls. (=0.0250 mol) of DIBAH, after which the solution was made up to 50 mls. with absolute toluene. 6.55 gms. (=0.025 mol) of triphenyl phosphine and 150 mls. of freshly distilled acetonitrile were added to the resulting solution of the aldehyde-reduction complex.

2.7 mls. (=0.025 mol) of concentrated $H_2SO_4$ were added to the pale yellow homogeneous solution at 25° C. in approximately 2 minutes, while stirring vigorously. A pale yellow cloudy liquid was formed with generation of heat (the temperature rose to approximately 50°).

Stirring was then carried out for 24 hours under nitrogen at 25° C. after which it was found from the UV-measurements of the reaction mixture that the $\beta_{20}$-aldehyde from which was started had been converted substantially quantitatively into the corresponding phosphonium salt.

EXAMPLE 7

5.45 gms. (0.025 mol) of all-trans $\beta_{15}$-aldehyde were reduced in 50 mls. of toluene with 5 mls. of DIBAH.

150 mls. of nitroethane, 6.55 gms. (0.025 mol) of triphenylphosphine were successively added to the solution of the reduction complex succeeded by the addition of 2.70 mls. (0.05 mol) of concentrated $H_2SO_4$ while stirring vigorously (in approximately 2 minutes).

Stirring was continued at 25° under nitrogen for two hours. The yield of $\beta_{15}$-phosphonium salt, calculated from the UV-spectrum of the reaction mixture, was 69%.

EXAMPLE 8

7.85 gms. (=0.025 mol) of crystalline all-trans $\beta_{20}$-methyl ester were dissolved and reduced with 10 mls. (0.05 mol) of DIBAH in 50 mls. of absolute toluene.

6.55 gms. of triphenylphosphine (=0.025 mol) and 150 mls. of benzonitrile were successively added to the reaction mixture at 25° C., succeeded by the addition of 5.4 mls. of concentrated $H_2SO_4$ (=0.1 mol) in approximately two minutes while stirring vigorously. During the addition of the sulphuric acid, the temperature of the reaction mixture rose to approximately 55° C. and a dark brown discoloration occurred.

The reaction mixture was then stirred under nitrogen at 25° C. for 4 hours.

From the UV-measurements of the brown-coloured homogeneous reaction mixture a yield was found of phosphonium salt of 75% (calculated on the quantity of ester from which was started).

What is claimed is:

1. A method of producing a member selected from the group consisting of trialkyl phosphonium compounds and triaryl phosphonium compounds which method comprises reacting the reduction complex capable of being hydrolyzed to an alcohol and obtained in reducing a member selected from the group consisting of aldehydes, ketones, carboxylic acids and carboxylic acid esters with a hydride of at least one metal selected from the group consisting of aluminum and boron with a proton donor and a member selected from the group consisting of trialkyl phosphines and triaryl phosphines.

2. The method of claim 1 wherein the reduction complex capable of being hydrolyzed to an alcohol is that obtained in reducing a member selected from the group consisting of conjugated unsaturated carboxylic acids, aldehydes, ketones and carboxylic acid esters.

3. The method of claim 2 wherein the conjugated unsaturated carboxylic acids, aldehydes, ketones and carboxylic acid esters have the carbon structure of vitamin A.

4. The method of claim 1 wherein the reduction complex is a reduction complex of diisobutyl aluminum hydride.

5. The method of claim 1 wherein the phosphine used is triphenyl phosphine.

6. The method of claim 1 wherein the reaction is carried out in an inert polar solvent or diluent.

7. The method of claim 6 wherein the reaction is carried out in nitrobenzene.

8. The method of claim 1 wherein the proton donor is sulfuric acid.

References Cited

UNITED STATES PATENTS

| | | | |
|---|---|---|---|
| 2,917,539 | 12/1959 | Isler et al. | 260—606.5 X |
| 2,945,069 | 7/1960 | Stern | 260—606.5 |
| 3,078,256 | 2/1963 | Wittig et al. | 260—606.5 X |
| 3,125,555 | 3/1964 | Paré et al. | 260—606.5 X |
| 3,294,844 | 12/1966 | Sarnecki et al. | 260—606.5 |

DELBERT E. GANTZ, Primary Examiner

W. F. W. BELLAMY, Assistant Examiner